United States Patent [19]

Tomita

[11] Patent Number: 4,990,078
[45] Date of Patent: Feb. 5, 1991

[54] STRUCTURE OF LIP DRIVE PORTION OF T-DIE

[75] Inventor: Yoshiyuki Tomita, Tanashi, Japan

[73] Assignee: Sumimoto Heavy Industries, Ltd., Tokyo, Japan

[21] Appl. No.: 392,798

[22] Filed: Aug. 11, 1989

[51] Int. Cl.⁵ ............................................. B29C 47/16
[52] U.S. Cl. ................................. 425/141; 264/40.5; 425/133.5; 425/466
[58] Field of Search ............... 425/140, 141, 466, 171, 425/172, 145, 143, 384, 381, 133.5; 264/40.1, 40.2, 40.5; 162/347, 336, 252

[56] References Cited

U.S. PATENT DOCUMENTS

| 2,928,464 | 3/1960 | Western et al. | 162/347 |
| 2,963,741 | 12/1960 | Longstreth et al. | 425/466 |
| 3,645,843 | 2/1972 | Schmaeng | 162/347 |
| 3,940,221 | 2/1976 | Nissel | 425/143 |
| 4,514,348 | 4/1985 | Iguchi et al. | 264/40.1 |

FOREIGN PATENT DOCUMENTS 60-50133 11/1985 Japan .
62-184832 8/1987 Japan .
62-220317 9/1987 Japan .

OTHER PUBLICATIONS

Furuhashi et al, "Automatic Line for Adjusting Thickness of Sheet Film," Converteck, Kakohgititsu Kenkyukai, pp. 41–48.

Iguchi & Sano, "Control of Film thickness of Extrusion Molding," Gosei Jushi, vol. 29, No. 3 (1983-3), pp. 1–7.

Kondo, "Automatic Dip Adjustment Die—Autoflex," Gosei Jushi, vol. 29, No. 3 (1983-3).

"Fully-Automatic Thickness Control System Auto-Profiller," Demonstration of Products by Johoku Seisakusho Ltd., Converteck, 1988-1, pp. 71–73.

Patent Abstracts of Japan, vol. 13, No. 265, Jun. 19, 1989 (JP-1-67325, Mar. 14, 1989).

Primary Examiner—Jay H. Woo
Assistant Examiner—James P. Mackey
Attorney, Agent, or Firm—Armstrong, Nikaido, Marmelstein, Kubovcik & Murray

[57] ABSTRACT

A lip drive structure for a T-die including a main body structure member having an elongated nozzle orifice defined by a pair of lip portion facing each other, a nozzle structure portion including one of the lip portions and formed at the lower end of the main body structure member so as to be integrally connected to the same through an elastically deformable portion, a plurality of bellows disposed on a side surface of the main body structure member on the side of the nozzle structure portion, and a drive section structure member fastened to the bellows at its upper portion and fastened to the lip structure portion at its lower portion. Air supply holes are formed in the drive section structure member to enable the bellows to be supplied with compressed air. The drive section structural member is divided into a plurality of elements in the longitudinal direction.

5 Claims, 3 Drawing Sheets

δ DISPLACEMENT

SUPPLY PRESSURE-LIP DISPLACEMENT
STATIC CHARACTERISTIC

STRUCTURE OF LIP DRIVE PORTION OF T-DIE

BACKGROUND OF THE INVENTION

This invention relates to a structure of a lip drive portion of a T-die.

For lamination processes in which a base formed of paper, aluminum foil or plastic is coated with a resin, systems for controlling the coating thickness to improve the quality of worked products as well as to reduce the amount of resin required are in increasing demand. For realization of such systems, development of a T-die in which the rate at which a molten resin flows out can be controlled is an important technical theme.

Conventionally, the rate at which a molten resin flows out of a T-die is adjusted by manually rotating gap adjusting bolts provided in association with the lip portion of the die. Types of drive systems such as a heat bolt system and a servo motor system have been adopted for automatization of this adjustment. The heat bolt system is based on the utilization of thermal expansion of bolts. In this system, however, the time required to perform heating or cooling is long and the responsiveness of the drive system is therefore considerably low. The servo motor system is based on the idea of using a robot system instead of the conventional manual operation. In this system, one or a plurality of motors are used to successively rotate bolts. However, it is not possible to drive all the bolts simultaneously, resulting in an increase in the adjustment time.

SUMMARY OF THE INVENTION

In view of the problems of the conventional art, an object of the present invention is to provide a T-die having a lip drive structure in which the gap can be adjusted at high speed and with accuracy.

In accordance with the present invention, there is provided a lip drive structure for a T-die comprising: a main body structure member having an elongated nozzle orifice defined by a pair of lip portions facing each other; a nozzle structure portion including one of said lip portions formed at the lower end of said main body structure member so as to be integrally connected to the main body through an elastically deformable member; a plurality of bellows disposed on a side surface of said main body structure member on the side of said lip structure portion; a drive section structure member fastened to an upper portion of said bellows and fastened to a lower portion of said nozzle structure portion air supply holes formed in said drive section structure member and means to supply compressed air to said bellows.

Compressed air can be supplied through the air supply holes of the drive structure member to the interior of the bellows to expand the bellows and to thereby apply a moment from the drive section structure member to the nozzle portion through the nozzle structure member, thereby displacing the nozzle portion. The drive section structure member is divided with split grooves formed therebetween, thereby enabling the respective drive sections to be operated without interference between adjacent drive sections.

DESCRIPTION OF THE PREFERRED EMBODIMENT

Figure 1:
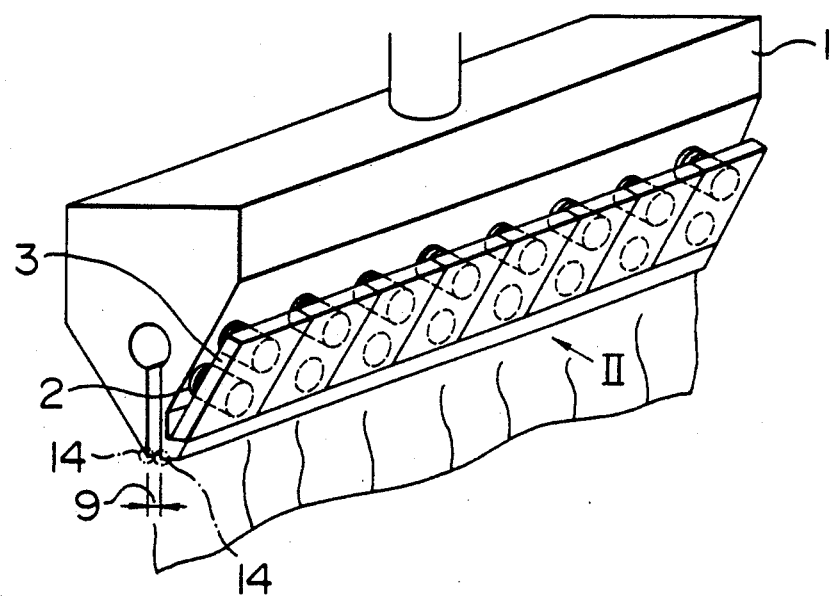
FIG. 1 is a perspective view of a T-die lip portion.

FIG. 1 shows in perspective a lip portion of a T-die to which the present invention is applied. The T-die essentially consists of three types of components: a main body structure member 1, a plurality of bellows 2 disposed over one side wall of the main body structure member 1, and a drive section structure member 3 which connects the bellows 2 and a lip portion 14. In this combination, the number of drive sections can be selected as desired.

Figure 2:
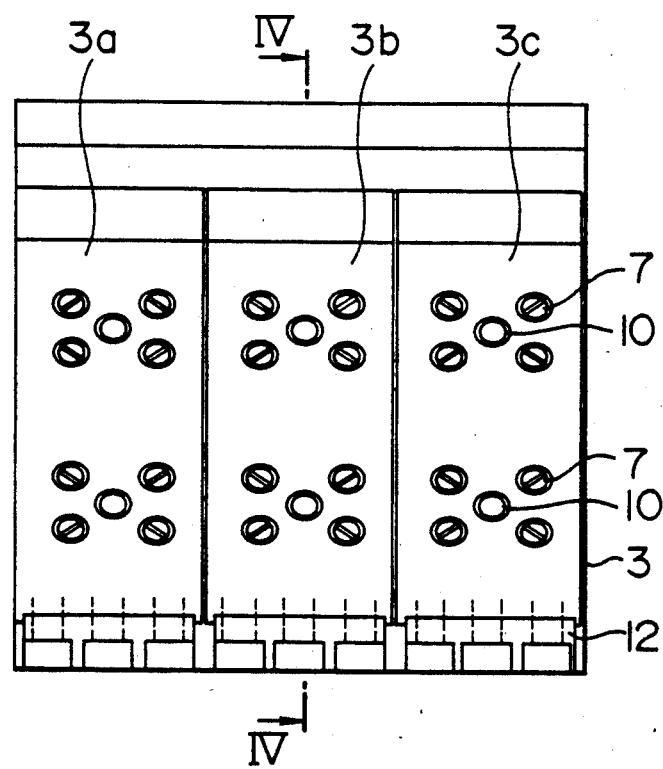
FIG. 2 is an illustration as viewed in the direction of the arrow II in FIG. 1.
Figure 3:
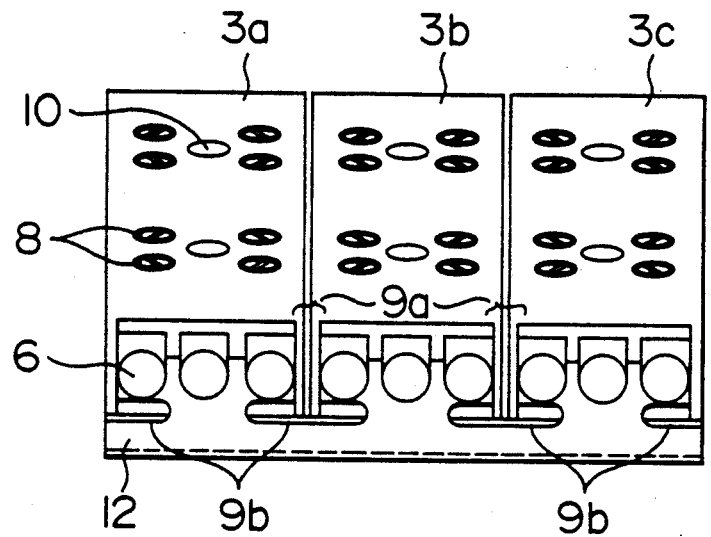
FIG. 3 is an illustration as viewed from the bottom of FIG. 2.
Figure 4:
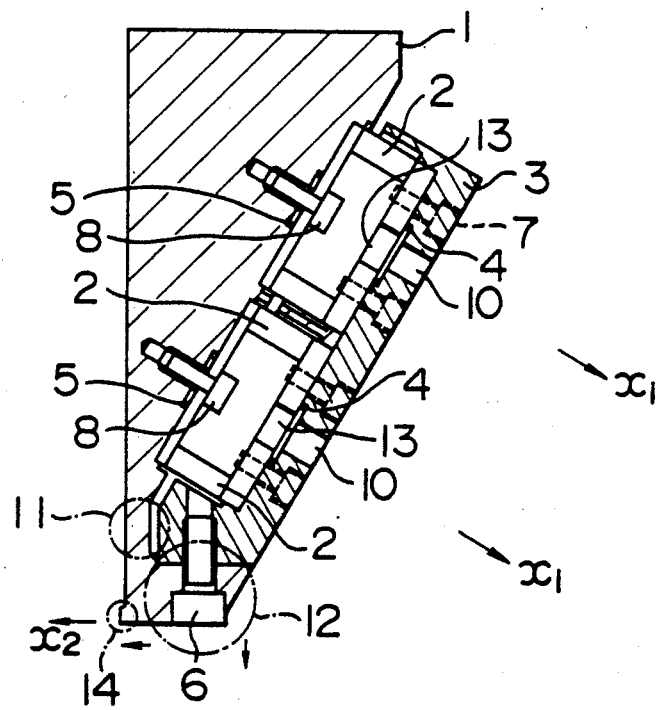
FIG. 4 is a cross-sectional view taken along the line IV—IV of FIG. 2.

FIG. 2 is a diagram as viewed in the direction of the arrow II of FIG. 1, FIG. 3 is a bottom view of FIG. 2 and FIG. 4 is a cross-sectional view taken along the line IV—IV of FIG. 2. The bellows 2 are fastened and fixed to the main body structure member 1 by means of bolts 8 and are also fastened and fixed to the drive section structure member 3 by bolts 7. Seals 4 and 5 (FIG. 4) are disposed at fastened portions of the bellows 2 to prevent leaks of compressed air in the bellows 2.

The main body structure member 1 has an elastically deformable portion 11 and a nozzle structure portion 12 which are formed integrally with each other in the vicinity of a nozzle portion of the main body structure member 1. The nozzle structure portion 12 and the drive section structure member 3 are integrally fastened by means of bolts 6.

The drive section structure member 3 has in each of its separate sections a pair of air supply holes 10 corresponding to the pair of bellows mated with the drive section structure member 3. Each bellows 2 has an air supply hole 13 (FIG. 4) which is positioned so as to be coaxial with the air supply hole 10. The drive section structure member 3 is divided into a plurality of structural elements 3a, 3b, 3c.... Vertical and lateral slits 9a and 9b are formed between these adjacent structural elements. Thus, these independent structural elements constitute a plurality of drive sections.

Figure 5:
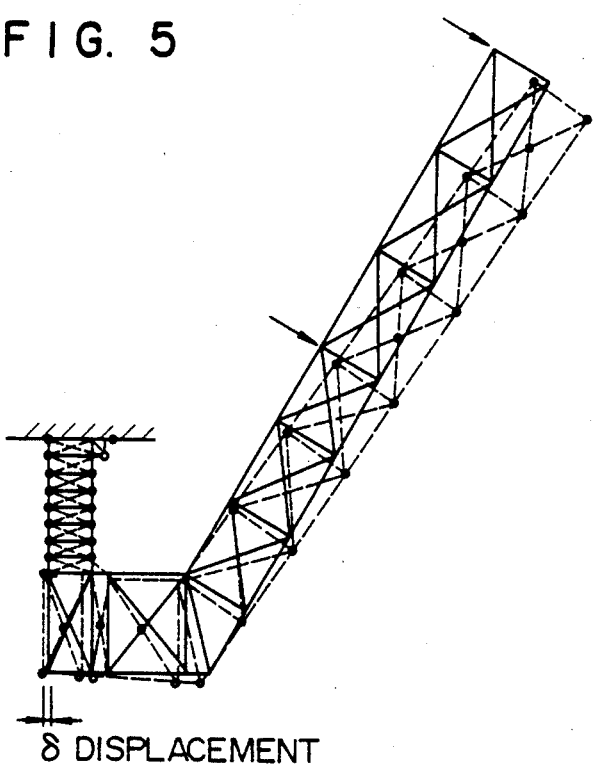
FIG. 5 is an illustration of the deforming operation of a drive section.
Figure 6:
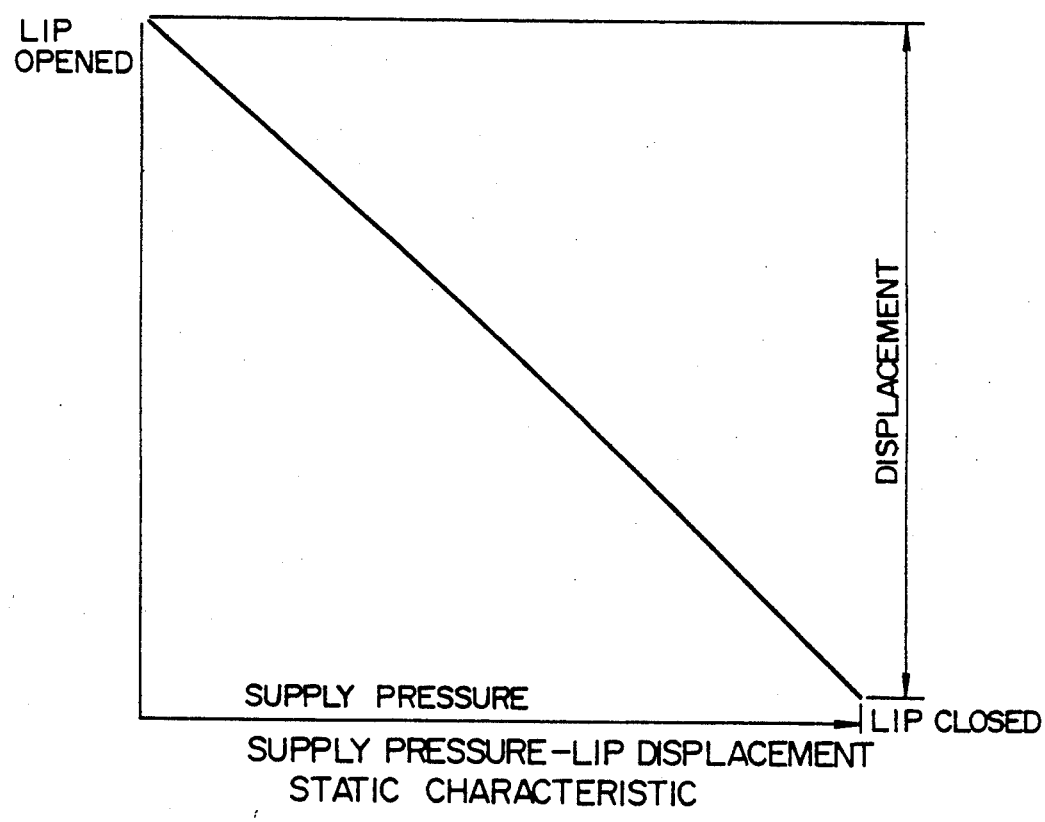
FIG. 6 is a diagram of a pressure-displacement characteristic of a lip portion.

If compressed air is supplied to each bellows 2 through the air supply hole 10, a force indicated by the arrow $x_1$ in FIG. 4 is produced between the main body structure member 1 and the drive section structure member 3 because the mechanical rigidity of the bellows in the axial direction is smaller than those of the other structural members. The force in the direction $x_1$ is transmitted as a moment to the elastically deformable portion 11. Since the mechanical rigidity of the elastically deformable portion 11 is smaller than that of the main body structure member 1 and the drive section structure member 3, the elastically deformable portion 11 is deformed in an elastic deformation manner, thereby moving the lip portion 14 in a direction $x_2$ (FIG. 5). The displacement $\delta$ thereby created is generally proportional to the moment transmitted from the bellows 2 or the compressed gas pressure that is the source of this moment. FIG. 6 shows an example of the displacement characteristic.

As described above, the lip opening can be controlled as desired by selecting the pressure of compressed gas supplied to the bellows. Furthermore, it is possible to control the lip opening at a plurality of positions simultaneously and independently by simultaneously and independently controlling the gas pressures supplied to the respective drive mechanisms.

If a portion of the lip portion is driven in the above-mentioned direction, other portions adjacent to the driven portion in the longitudinal direction are also displaced by interference. The multiplicity of slits 9a and 9b are provided to minimize the degree of this interference and, hence, the displacement due to the interference.

The present invention has been achieved with the view of driving of T-die lip portions. However, it is also applicable to precision drive mechanism for various types of precision instruments including working machines, three-dimensional measuring apparatus, semiconductor manufacturing apparatus and the like.

In accordance with the present invention, the operation of each drive section is based on the expansion of the bellows and is therefore improved in the response. In the case of the ordinary thermal expansion type of drive unit, the time constant is about 10 to 20 minutes. In contrast, in accordance with the present invention, the time constant is 1 sec. or less.

The force of expansion of the bellows is transmitted from the drive section structure member to the nozzle structure member to control the elastic deformation of the nozzle portion. This system is substantially free from hysteresis and has a high driving resolution.

In the structure of divided drive sections, the degree of interference between adjacent drive sections is small.

It is possible for the divided drive sections to effect driving simultaneously at a multiplicity of points as well as to effect driving without interference between adjacent drive sections, thus remarkably improving the drive controllability.

What is claimed is:

1. An extruder comprising a die housing defining a T-die therein, adapted to allow the extrusion of molten resin therethrough; die nozzle means outwardly terminating said T-die and forming a die opening, comprising two substantially parallel, elongated lip members; elastically deformable pivot means mounted on said die housing and operatively attached to at least a first of said elongated lip members so disposed as to permit the opening of said nozzle means to be adjusted by pivoting said first lip member; direct drive means disposed along the length of said first lip member for driving said pivot means and including a plurality of compressed air actuated bellows, positioned such that said pivot means is disposed between said drive means and said nozzle means; and means to supply compressed air to said bellows; whereby increasing the supply of said compressed air decreases the opening of said nozzle means and decreasing the supply of said compressed air increases the opening of said nozzle means.

2. The extruder according to claim 1 wherein said drive means comprises a plurality of bellows disposed lengthwise along said first lip member, and said compressed air supply means independently supplies and separately controls each of said bellows.

3. The extruder according to claim 2 wherein said direct drive means includes a plurality of sections each associated with each of said bellows, wherein each of said sections is separated from its next adjacent section by a split groove.

4. The extruder according to claim 3 wherein all of said drive means are operatively attached to said first lip member which is a single continuous member.

5. The extruder according to claim 1 wherein only one lip member is pivotable.

* * * * *

UNITED STATES PATENT AND TRADEMARK OFFICE
CERTIFICATE OF CORRECTION

PATENT NO. : 4,990,078

DATED : February 5, 1991

INVENTOR(S) : Yoshiyuki TOMITA

It is certified that error appears in the above-identified patent and that said Letters Patent is hereby corrected as shown below:

On the cover page, Item [73], "Sumimoto Heavy Industries, Ltd." should read -- Sumitomo Heavy Industries, Ltd. --.

Signed and Sealed this

Fifteenth Day of December, 1992

*Attest:*

DOUGLAS B. COMER

*Attesting Officer*     *Acting Commissioner of Patents and Trademarks*